Figure 1:
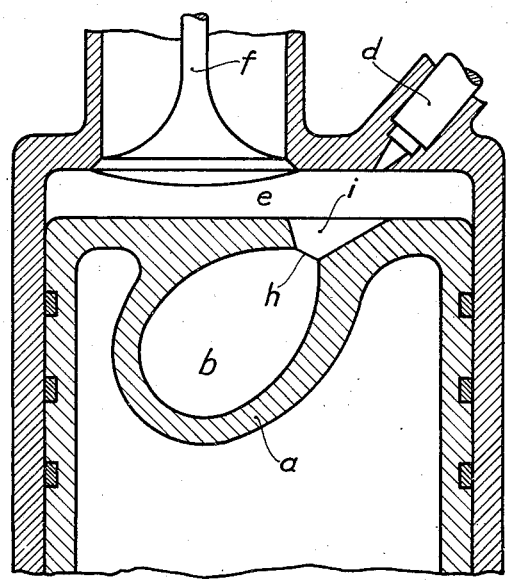

May 20, 1930.  F. LANG  1,759,160

COMBUSTION POWER ENGINE

Original Filed Nov. 21, 1925

Inventor
Franz Lang
by Steward & McKay
his attorney.

Patented May 20, 1930

1,759,160

UNITED STATES PATENT OFFICE

FRANZ LANG, OF MUNICH-NYMPHENBURG, GERMANY, ASSIGNOR TO ACRO AKTIEN-GESELLSCHAFT, OF KÜSSNACHT AM RIGI, SWITZERLAND

COMBUSTION POWER ENGINE

Application filed November 21, 1925, Serial No. 70,615, and in Germany December 6, 1924. Renewed May 11, 1928.

This invention relates to a combustion power engine with airless injection of the fuel and self ignition of the latter, said engine being provided with a hollow space or chamber in the piston adapted to act as a compression chamber.

In the known engines of this kind the fuel enters from the injection nozzle immediately into the piston compression space and can be mixed with the inflowing air only in said compression chamber, said mixing point, however, being too late to insure a thorough mixing. Accordingly the combustion remains incomplete and the starting of the engine can be effected only with difficulty.

These drawbacks can be obviated, when, according to the present invention, the injected fuel and at least a part of the compressed air contact each other outside the hollow space of the piston, which space communicates with the cylinder space through at least one nozzle-like acting reduced aperture.

In the accompanying drawing two forms of construction of my improved combustion engine are illustrated in a diagrammatical manner, those parts of the engine, which are not absolutely necessary for the understanding of the invention, being omitted.

In the drawing

Figure 2:
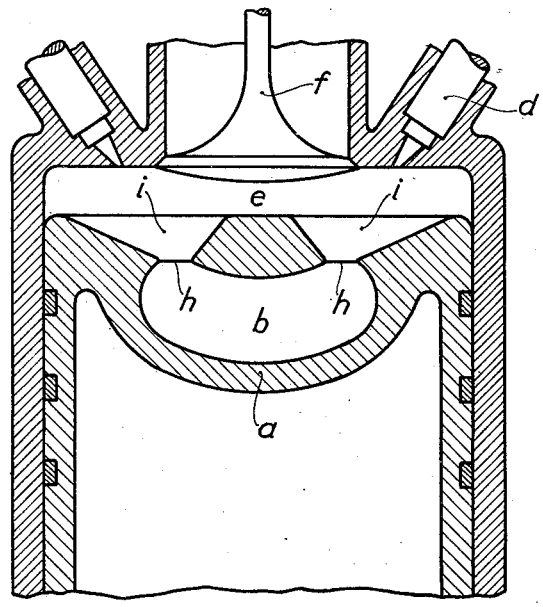

Fig. 1 is a vertical section through one end of the cylinder and the appertaining piston of my improved combustion engine and Fig. 2 is a similar vertical section through a modified form of construction.

The latter is differentiated from the first form of construction only by the use of two injection nozzles instead of one nozzle and the thereby conditioned special construction of the compression space in the piston.

In both forms of construction the piston head is indicated by the reference character $a$ and the compression space or chamber in the piston by the reference character $b$, while $d$ indicates the fuel-injection-nozzle, arranged in the cylinder-head. In both forms of construction the compression-chamber of the piston, as shown, is arranged lengthwise at an angle to the axis of the piston. In Fig. 1 it is shown as oblique to said axis and in Fig. 2 at a right angle to the same. The piston chamber $b$ communicates with the combustion-space $e$ in the cylinder by at least one communicating opening or mouth flaring outward or funnel-shaped at $i$ so as to form a nozzle-like communication terminating in a restricted inlet at $h$. In Fig. 1 there is one such communication shown while in Fig. 2 two of them are represented. Opposite each communication or nozzle-like passage $i\,h$ is arranged a fuel-injector $d$ preferably also disposed at an angle to the piston axis in communication with the cylinder-combustion-chamber $e$ and in line with the nozzle-like mouth $i\,h$ so as to adapt it to project a spray or jet of fuel across the space $e$ toward said mouth at the proper time, that is, toward the end of the compression stroke of the piston. In the construction according to Fig. 1 one such injector is shown while Fig. 2 shows two, one to serve each mouth $i\,h$. In both forms of construction the air inlet valve is indicated by the reference character $f$.

The operation is as follows:

The air sucked into the cylinder during the suction-stroke is compressed during the subsequent compression stroke of the piston and thereby a flow of the air is created, passing through the reduced aperture $h$ into the piston chamber $b$. The fuel injected through the fuel-injector or nozzle $d$ during the last part of the compression stroke contacts with the compressed air flowing toward the compression-chamber $b$ at least partially within the space $e$, that is, before reaching the reduced aperture $h$, said air being heated on account of the compression, and a preliminary mixing and ignition is effected in said cylinder space $e$. The ignition, once started, is then transmitted to all those points where a combustible mixture has been formed.

On account of the funnel arranged in front of the reduced aperture $h$, the condition of the air current flowing toward said aperture is manifestly more favorable for certainty of combustion than without such a funnel. Accordingly the preliminary mixing of air and fuel before the nozzle-like acting reduced aperture is more intimate and more effective than without such a funnel-shaped passage.

In both forms of construction the axes of the injection nozzles *d* are arranged obliquely to the axis of the cylinder. The piston compression space, the reduced apertures and the funnel-shaped passage are arranged substantially in line with the oblique position of the injection nozzle when the piston is at the end of the compression stroke, as shown, so that the nozzle will inject fuel directly toward these parts. This oblique arrangement of the injection nozzle can be employed especially advantageously in such engines, as are to be rebuilt and in which valves, already present in the cover of the cylinder, do not permit the arrangement of the injection nozzle in the center of the cylinder-cover.

I claim:

1. In a combustion engine with self-ignition comprising a cylinder and a piston working therein, a compression chamber formed in the piston, said chamber being arranged lengthwise at an angle to the axis of the piston and in communication with the compression space of the cylinder, in combination with at least one fuel-injector, arranged to inject fuel toward the piston-chamber at the end of the compression stroke.

2. In a combustion engine with self-ignition comprising a cylinder and a piston working therein, the piston being provided with a compression-chamber arranged at an angle to the axis of the piston and communicating with the compression space in the cylinder, and at least one fuel-injector also arranged at an angle to said piston axis and in line with the communicating opening of the compression-chamber of the piston.

3. A combustion-engine with self-ignition comprising a cylinder in combination with a piston working therein, the piston being provided with a compression-chamber arranged obliquely to the piston-axis and formed with a mouth or opening for communication with the compression-space in the cylinder, and a fuel-injector in the cylinder arranged to inject fuel toward said mouth or opening.

4. A combustion-engine with self-ignition comprising a cylinder in combination with a piston working in the same, the piston being provided with a compression-chamber arranged lengthwise obliquely to the piston-axis and formed with a mouth or opening for communication with the compression-space in the cylinder, and a fuel-injector in the cylinder also arranged obliquely to said axis and in line with the mouth of the said compression-chamber in the piston.

5. Combustion engine as set forth in claim 1 wherein the communication from the compression-chamber is formed as a nozzle-like outwardly tapering and inwardly restricted passage.

6. A combustion-engine with self-ignition comprising a cylinder in combination with a piston provided in its head with a compression-chamber arranged lengthwise at an angle to the piston-axis and formed with a nozzle-like mouth communicating with the compression-space of the cylinder, and a fuel-injector also at an angle with the piston axis and in line with the nozzle-like mouth when the piston is at the end of the compression stroke.

7. In a combustion engine with self-ignition, a cylinder and piston arranged to form a compression chamber divided into a plurality of compartments, one compartment being of decreasing dimensions during the compression stroke and the other being of fixed dimensions, the two compartments communicating at all times by a throttling orifice, the fixed-dimension compartment being arranged lengthwise in the piston at an angle to the axis thereof.

8. A combustion engine with self-ignition as set out in claim 7 including a fuel-injector adapted to inject fuel toward the fixed-dimension compartment during the last part of the compression stroke.

In testimony whereof I have hereunto affixed my signature.

FRANZ LANG.